March 31, 1959 D. G. BINDON ET AL 2,880,406
MAGNETIC-CORE STORAGE DEVICES FOR DIGITAL COMPUTERS
Filed May 18, 1956 2 Sheets-Sheet 1

INVENTORS
DOUGLAS GEORGE BINDON
IVAN PAUL VENN CARTER
MARTIN JOSEPH FRIEDMAN
BY
Cameron, Kerkam & Sutton
ATTORNEYS INVENTORS
DOUGLAS GEORGE BINDON
IVAN PAUL VENN CARTER
MARTIN JOSEPH FRIEDMAN
BY
Cameron, Kerkam & Sutton
ATTORNEYS 2,880,406

MAGNETIC-CORE STORAGE DEVICES FOR DIGITAL COMPUTERS

Douglas George Bindon and Ivan Paul Venn Carter, Manchester, England, and Martin Joseph Friedman, Pisa, Italy, assignors to Ferranti Limited, Hollinwood, Lancashire, England, a company of Great Britain Application May 18, 1956, Serial No. 585,792

Claims priority, application Great Britain May 25, 1955

8 Claims. (Cl. 340—174)

Figure 1:
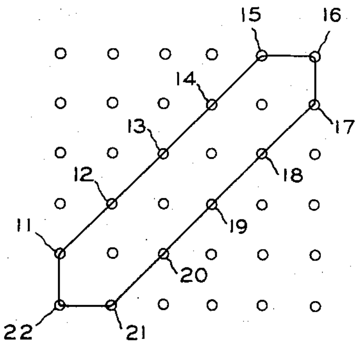

This invention relates to magnetic-core storage devices for digital computers which, in the interest of brevity, may be referred to hereinafter as stores.

Such a store includes an array, hereinafter referred to as a matrix, of like magnetic ring cores disposed in mutually perpendicular columns and rows to be within a regular rectangular pattern. All the cores of a row are threaded by a single conductor, which thus has a single-turn linkage with each core. The conductors of all the rows are connected to a common busbar at one side of the matrix and are energisable singly through some electronic switching device to which their free ends are connected. A similar system of conductors and switching device is provided for the columns of the matrix.

To write information into a given core, the switching devices are arranged to energise coincidentally, by a writing pulse, the conductors of the row and column containing that core. The magnetising current in each conductor is insufficient to saturate any of the cores magnetically by itself or to reverse the state of magnetisation of any core previously saturated. In the selected core, however, the currents produce additive fluxes sufficient to saturate this core in a direction which represents the binary digit being recorded.

To read out information from the store, an additional conductor—hereinafter referred to as the read wire—is threaded through all the cores in the matrix and connected to suitable response apparatus. To read the information stored in a particular core, the row and column conductors which define that core are each energised by a reading pulse. If the resulting flux is in the same sense as that in which the core has already been magnetised by the previous writing pulse no appreciable output voltage is induced in the read wire. If the resulting flux is in the opposite sense, a substantial output pulse is induced in the read wire. The nature of the digit which has been stored in that core is thereby indicated.

Such an arrangement and the method of operating it are of course well known.

Difficulties arise with such an arrangement owing to the tendency of unwanted E.M.F.'s to be induced in the read wire by the fluxes set up by the reading or writing currents in the row-and-column conductors or by stray magnetic fields, common to the whole matrix, set up elsewhere in the computer.

An object of the present invention is to provide a magnetic-core store of the kind described in which a read wire is so disposed as to reduce very substantially the induction in it of unwanted E.M.F.'s of the kind referred to.

In accordance with the present invention, a magnetic-core store includes a matrix of like magnetic ring cores disposed in mutually perpendicular columns and rows to lie within a regular rectangular pattern, a first plurality of conductors, one for each column of cores and threading all the cores in that column, a second plurality of conductors, one for each row of cores and threading all the cores in that row, means for selectively energising said conductors so as to saturate any core in a desired sense, and a read wire threading all the cores of the matrix once each along a path of an imaginary figure of Lissajous form.

Also in accordance with the invention, a magnetic-core store includes features as set forth in the preceding paragraph modified in that said imaginary figure is of Lissajous form except between at least one penultimate column of cores and the adjacent end column of cores.

Also in accordance with the invention, a magnetic-core store includes a matrix of like magnetic ring cores disposed in mutually perpendicular columns and rows to lie within a regular rectangular pattern, a plurality of conductors, one for each column of cores and threading all the cores in that column, a second plurality of conductors, one for each row of cores and threading all the cores in that row, means for selectively energising said conductors so as to saturate any core in a desired sense, and a read wire threading all the cores of the matrix once each along a path formed by interconnecting a plurality of imaginary figures each of Lissajous form, the interconnections being such that substantially no resultant electromotive force is induced in the read wire by a varying magnetic field common to the whole mattrix.

Also in accordance with the invention, a magnetic-core store includes features as set forth in the preceding paragraph modified in that said imaginary figures are each of Lissajous form except between at least one penultimate column of cores and the adjacent end column of cores.

By "a figure of Lissajous form" is meant a figure which differs from a strictly Lissajous figure only in so far as it is constituted by straight lines rather than curves.

The term "ring" should be understood as including oval and semi-rectangular shapes as well as the strictly circular or toroidal.

By "like" magnetic cores is meant that the cores have like magnetic characteristics within reasonable tolerances.

Figure 2:
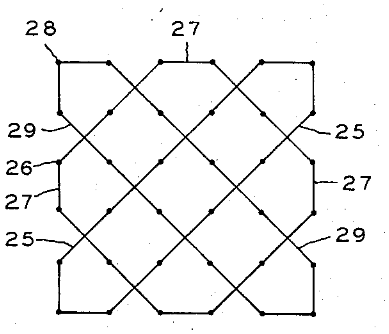
Figure 3:
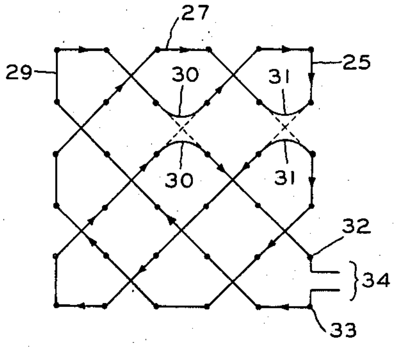
Figure 4:
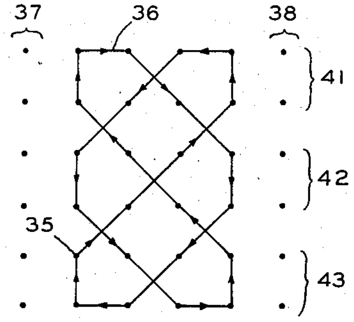
Figure 5:
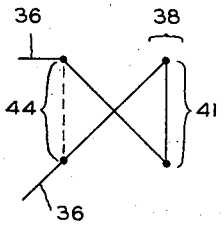
Figure 6:
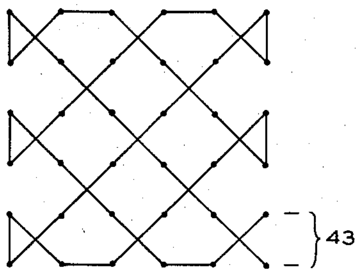
Figure 7:
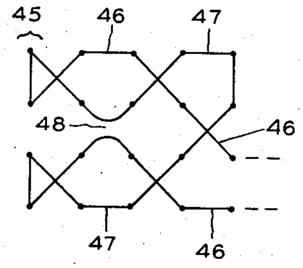
Figure 8:
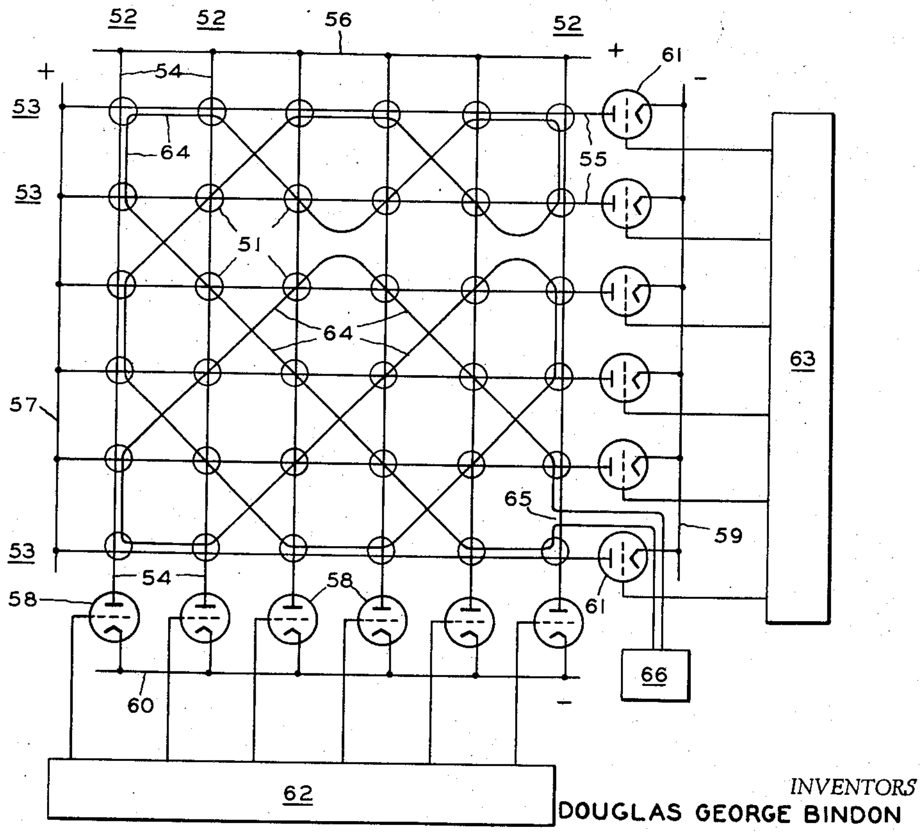

In the accompanying diagrams,

Figures 1 to 3 illustrate a method of plotting the path of a read wire in accordance with one embodiment of the invention, Figures 4 and 5 illustrate a method of plotting the path of a read wire in accordance with another embodiment, Figure 6 shows a read wire disposed in accordance with the embodiment of Figures 4 and 5, Figure 7 shows a read wire disposed in accordance with another embodiment, and Figure 8 shows in diagrammatic form a magnetic-core store in accordance with one embodiment of the invention.

In carrying out the invention, the path followed by a read wire in threading the cores of a given matrix of $p$ columns and $q$ rows of ring cores may conveniently be determined by the appropriate one of the following graphical methods, in the description of which such terms as "core," "matrix," "read wire" etc. refer to the graphical representations of the components rather than to the components themselves, unless the context indicates otherwise.

*Method A.*—Where $p$ and $q$ are even integers:

(1) Plot a derived matrix as a regular rectangular array of cores in accordance with Rule 1(*a*)(i) stated below;

(2) Plot the path of the read wire through the cores of the derived matrix in accordance with Rule 2;

(3) Where the resulting plot has more than one closed loop, interconnect the loops in accordance with Rule 3;

(4) Break the resulting single loop between any two adjacent cores.

*Method B.*—(Alternative to Method A):

(1) Obtain and plot a derived matrix in accordance with Rule 1(*a*)(ii);

(2) and (3) (As steps (2) and (3) of Method A);

(4) Add to the derived matrix, one on each side of it, the two columns of cores required to convert the derived matrix to the given matrix;

(5) Include each of the additional two columns of cores in the plot of the read wire in accordance with Rule 4;

(6) Break the resulting single loop between any two adjacent cores.

*Method C.*—Where $p$ is an odd integer and $q$ an even integer:

(1) Obtain and plot a derived matrix in accordance with Rule 1(*b*);

(2) and (3) (as steps (2) and (3) of Method A);

(4) Add to the derived matrix the column of cores required to convert the derived matrix to the given matrix;

(5) Include the additional cores in the plot of the read wire in accordance with Rule 4;

(6) Break the resulting single loop between any two adjacent cores.

The rules referred to above are as follows.

*Rule 1.*—To obtain a derived matrix of $m$ columns and $n$ rows of cores, where both $m$ and $n$ are even integers, from a given matrix of $p$ columns and $q$ cores. (*a*) Where $p$ and $q$ are both even: give $m$ and $n$ the values (i) $p$ and $q$, or (ii) $p-2$ and $q$. (*b*) Where $p$ is odd and $q$ even; give $m$ and $n$ the values $p-1$ and $q$.

*Rule 2.*—To plot with one or more closed loops the path of a read wire through the cores of a derived matrix, each core being threaded once only.

For purposes of identification the columns and rows of the matrix are considered as numbered in order from 1 to $m$ along the $x$ axis of a Cartesian system of co-ordinates and from 1 to $n$ along the $y$ axis, respectively, from the origin (1, 1); each core may thus be defined uniquely by an ordered pair of integral co-ordinates $(x, y)$ where $x$ is the number of its column and $y$ is the number of its row.

(*a*) Start at any core defined by the term $(u, v)$, where $u$ is an odd integer between 1 to $m-1$ inclusive and $v$ is an even integer between 2 to $n$ inclusive, and plot the course of the read wire in the core order determined by the core sequence. By the "core sequence" is meant a finite sequence of terms each of which is an ordered pair of integers, the sequence starting with the term $(u, v)$ and having as it $r$th term the $(r+u-1)$th term of the infinite sequence 1, 2, 3, . . . $(m-2)$, $(m-1)$, $m$, $m$, $(m-1)$, $(m-2)$, . . . 3, 2, 1, 1, 2, 3, . . . etc. (hereinafter referred to as the $x$ sequence), and the $(r+v-1)$th term of the infinite sequence 1, 2, 3, . . . $(n-2)$, $(n-1)$, $n$, $n$, $(n-1)$, $(n-2)$, . . . 3, 2, 1, 1, 2, 3, . . . (hereinafter referred to as the $y$ sequence), the plot being continued until a closed loop is obtained.

(*b*) If there are still some cores unthreaded, start with any unthreaded core indicated by another $(u, v)$ term as above defined and plot the course of a further loop of read wire in the core order determined by the core sequence which has as its first term that new $(u, v)$ term, until another closed loop is obtained.

(*c*) If there are further cores still unthreaded, repeat sub-rule (*b*) until all cores are threaded.

*Rule 3.*—To interconnect two or more closed loops.

(*a*) Determine for each loop the direction and relative value of the E.M.F. that would be induced in a corresponding loop of wire by a varying magnetic field common to the whole matrix.

(*b*) Connect the loops together in series in such sense that such E.M.F.'s would counterbalance one another, each loop of a pair to be interconnected being broken between cores that are adjacent to one another on that loop and adjacent to the cores between which the other loop is broken.

*Rule 4.*—To include on the read wire an added column of cores.

As $n$ is always even, there is an even number of cores in the added column (now an end column) and in the penultimate column adjacent to it. The cores in the latter are at this stage in pairs of successive cores, the two cores of each pair being joined direct by the path of the read wire.

Divert the part of the path between each pair of such successive cores in the penultimate column to include between those cores the two adjacent cores in the adjacent end column, the two portions of the diverted path which extend from the two cores in the penultimate column to the two cores in the end column, each to each, crossing one another.

The actual read wire is applied to the actual matrix in accordance with the plot obtained by one of the methods just stated. At the "break" which results from the last step of the method the two ends of the read wire are coupled to the response apparatus of the computer where the information is required, or one end is earthed and the other so coupled.

The invention will now be described by way of example as applied to the case where the given matrix has 6 columns and 6 rows.

As $p$ and $q$ are both even, the derived matrix may also be 6 by 6, (Rule 1(*a*)(*i*)). The matrix is plotted by conventional symbols, $m$ and $n$ being each 6, as shown in Fig. 1, the columns being vertical and the rows horizontal, and the corresponding row-and-column conductors being omitted for clarity.

From Rule 2, the first core of the plot of the read wire may be defined by the $(u, v)$ term (1, 2), i.e. the core in the first column and second row. This core is indicated at 11.

The $x$ and $y$ sequences are each 1, 2, 3, 4, 5, 6, 6, 5, 4, 3, 2, 1, 1, 2, 3, . . . etc.

The $(u, v)$ term (1, 2) is also the first term of the core sequence to be followed.

From Rule 2(*a*) the 2nd term of this sequence is obtained by substituting 2 for $r$, and 1 and 2 for $u$ and $v$ respectively, in the expressions $(r+u-1)$ and $(r+v-1)$, obtaining 2 and 3 respectively. So the 2nd term of the core sequence is compounded of the 2nd term of the $x$ sequence and the 3rd term of the $y$ sequence, i.e. (2, 3)—indicated at 12.

The plot is continued in a similar manner through cores 13 to 15.

For the 6th term, $(r+u-1)$ becomes 6 and $(r+v-1)$ becomes 7. The 6th term of the $x$ sequence is again 6 and the 7th term of the $y$ sequence is 6, giving the 6th term of the core sequence as (6, 6), the core being indicated at 16.

The 7th term of the core sequence requires the 8th term 5 of the $y$ sequence, i.e. the $y$ sequence is now on its decreasing count. The core sequence term is (6, 5), the core being indicated at 17.

At the 8th term the $x$ sequence begins its decreasing count, the core sequence term is (5, 4), (core 18).

The plot continues through cores 19, 20, and 21. At core 22 the core sequence term is (1, 1); the next term (1, 2) completes the loop back to core 11.

As there are obviously a number of cores still unthreaded a fresh start has to be made in accordance with Rule 2(*b*). This second plot will be briefly described with reference to Fig. 2 in which the loop already completed is indicated at 25 and the cores are depicted merely as dots.

A convenient unthreaded core with which to begin this plot is that defined by the $(u, v)$ term (1, 4), indicated at 26. Plotting is carried out as before, the only difference being that the term $v$ is now 4 instead of 2. The result is a second closed loop 27.

As there are still cores unthreaded, a third start is made at, for example, the core (1, 6), indicated at 28, and a third loop 29 completed. All cores are now threaded.

The method of interconnecting the three loops in accordance with Rule 3 will be described with reference to Fig. 3, where the loops are indicated by the same reference numbers 25, 27, and 29 as before.

From elementary considerations it is plain that a varying magnetic field common to the whole matrix will induce E.M.F.'s acting in the same direction round the loops. It is assumed that this direction is clockwise, as indicated by the arrows. From an inspection of the figure it will be seen that loop 27 has approximately twice the area of either of the other loops and will therefore have approximately twice the E.M.F. induced in it. Loops 25 and 29 are therefore connected together so that the E.M.F.'s induced in them are additive, as indicated at 30, and the combined loop thus formed must be connected to loop 27 so that the combined E.M.F.'s of loops 25 and 29 oppose the E.M.F. of loop 27. A suitable interconnection is indicated at 31.

Alternatively, each of loops 25 and 29 may be connected direct to loop 27 and not to one another.

A single loop is thus provided. To complete the process this loop is broken between any convenient pair of adjacent cores—say cores 32 and 33—and connections 34 led off to the response apparatus.

The interconnections between any two loops should be effected between adjacent cores of both loops to minimise the disturbance of the symmetry of the pattern.

Using the plot of Fig. 3 for guidance, the actual read wire is applied to the actual matrix.

A magnetic-core store having the read wire disposed as described thus possesses the important advantage that E.M.F.'s induced by stray magnetic fields common to the whole matrix practically balance one another out. A further advantage is that as the read wire crosses each of the row and column conductors (omitted from Figs. 1 to 7 for clarity) an equal number of times in opposite directions, the currents directly induced in the read wire by the currents in these conductors are greatly reduced. Moreover, the ends of the read wire from which connections are made to the response equipment need not be further apart than the distance between adjacent cores.

The first two of the above advantages follow from the symmetrical disposition of the threaded read wire. This results from the fact that each of the imaginary figures 25, 27, and 29, which are interconnected to define the path of the read wire, is of Lissajous form. A Lissajous figure is derived by the interaction of two sinusoids. This form is imparted to each of the figures by the $x$ and $y$ sequences set forth in Rule 2($a$), each of which, it will be appreciated, is of an approximately sinusoidal character. The sequences are not strictly sinusoidal since each is formed by a series of straight lines, being thus of regular trapezoidal cyclic form rather than sinusoidal. Hence each figure, in so far as it is formed by straight lines rather than curved, cannot strictly be referred to as a Lissajous figure. As however the departure from the strictly Lissajous shape is in practice very slight the figure may fairly be described as of Lissajous form, and is so described throughout this specification.

The path of the read wire may alternatively be arrived at by means of Method B.

A derived matrix is obtained by Rule 1($a$)(ii) and the resulting 4 by 6 matrix is plotted as shown in Fig. 4. Starting with the core (1, 2), indicated at 35, the path of the read wire is plotted by the method indicated above, the arrows indicating the direction in which the line is drawn. The result this time is a single imaginary figure of Lissajous form—the closed loop 36.

To produce from this derived matrix the given 6 by 6 matrix it is necessary to add two further columns of 6 cores each. These are disposed one on each side of the derived matrix, as shown at 37 and 38. The cores of end column 38 are considered as grouped into three pairs of cores 41 to 43. The method of connecting each of such pairs to the read wire plot 36 of the derived matrix is indicated in Fig. 5, which reproduces to an enlarged scale the top right-hand corner of Fig. 4.

Opposite pair 41 of cores in end column 38 is the pair 44 in the adjacent penultimate column. In the Fig. 4 stage the path of the read wire connects cores 44 to one another direct. To include cores 41, in accordance with Rule 4, this part of the path is diverted to include cores 41 between cores 44, the two portions of the read wire which extend from cores 44 to cores 41, each to each, crossing one another.

Pairs 42 and 43, and the corresponding pairs of the other end column 37, are similarly included in the read wire. The resulting disposition of the read wire is shown in Fig. 6. The "break" for the output connections may be made between the cores of pair 43. The Lissajous form of the figure followed by the read wire is departed from between the penultimate and the end columns; but where (as is usually the case) the matrix has a large number of cores the deleterious effect of the departure on the advantages of the invention is insignificant.

Where the derived matrix is such as to absorb more than one loop the several loops are interconnected in accordance with Rule 3. When the end columns have been included, the Lissajous form of the figures are departed from between the penultimate and the end columns, in a similar manner to that described above, but the effect of such departure is again insignificant.

Where the term $p$ of the given matrix is an odd integer, Method C is employed. The application of Rule 1($b$) gives a derived matrix both terms $m$ and $n$ of which are even numbers. The course of the read wire is plotted for this matrix under Rule 2 as described above with reference to Fig. 3 (more than one loop) or Fig. 4 (one loop). To convert the derived matrix to the given matrix another column of cores has to be added under Rule 4 and the cores of this end column included in the read wire as described with reference to Fig. 5.

A 5 by 4 matrix with the read wire applied in this manner is shown in Fig. 7, the derived matrix being 4 by 4 and the added column being indicated at 45. It will be seen that the original plot has produced two loops 46 and 47 of equal area. These loops are interconnected at 48 to ensure counterbalancing of the E.M.F's induced by stray fields.

In each of the above described plotting methods, the derived matrix is obtained from the given matrix by subtracting one or both end columns rather than end rows. It will however be appreciated that the terms "column" and "row" are used in a purely relative sense and that accordingly if for any reason it should be required to derive a matrix by subtracting a row, rather than a column, it is only necessary to consider the matrix as turned through a right angle so that the columns become rows, and the rows become columns, and proceed according to the appropriate method described above.

A complete magnetic-core store having a 6 by 6 matrix is shown in Fig. 8.

The ring cores 51 are disposed in mutually perpendicular columns 52 and rows 53 to lie within a regular rectangular pattern. Each column 52 has one of a first plurality of conductors 54 which threads all the cores in that column. Each row 53 has one of a second plurality of conductors 55 which threads all the cores in that row.

To allow the conductors to be selectively energised so as to saturate any core in a desired sense, one end of each conductor 54 is connected to a common busbar 56 and the other end to the anode of an amplifier discharge tube 58 individual to that conductor. The cathodes of the tubes are connected to a common busbar 60. The control grids are connected to computer control equipment 62 arranged in known manner to apply appropriate voltage waveforms to the grids for selecting any desired core, as described below.

Similarly conductors 55 are connected between busbars 57 and 59 by way of discharge tubes 61 the control grids of which are connected to computer control equipment 63.

Busbars 56 and 57 are connected to the positive pole of a source of high tension the negative pole of which is connected to busbars 59 and 60.

The cores are threaded by a read wire 64 the path of which is plotted as described above with reference to Fig. 3. The loop of the read wire is broken at 65 and the ends applied to the response apparatus 66 of the computer where the read information is required.

In operation, to write information into a selected core the waveforms from equipment 62 and 63 are such as to energise the tube 58 of the column and the tube 61 of the row containing that core. As already explained, the magnetising current in each of the corresponding column and row conductors is insufficient to affect any core by itself, but in the selected core the currents produce additive fluxes sufficient to saturate this core to represent the binary digit being recorded.

To read the information stored in a particular core, the tubes of the column and row conductors which define that core are energised by waveforms from equipment 62 and 63. If the resulting flux is in the same sense as that in which the core has already been magnetised by the previous writing pulse no appreciable output voltage is induced in read wire 64. If the resulting flux is in the opposite sense, a substantial output pulse is induced in the read wire and delivered to, response apparatus 66.

In actual practice the number of cores in a matrix is much greater than in the examples discussed above. A 32 by 32 matrix is a typical size. It can be demonstrated mathematically that the number of closed loops in a $m$ by $n$ matrix is equal to the highest common factor of the numbers $m/2$ and $n/2$. The plot of a 32 by 32 matrix would therefore result in 16 closed loops. To avoid the complication of interconnecting all these loops correctly, a derived matrix in accordance with Rule 1($a$) (ii) may alternatively be used. This matrix is 30 by 32. The highest common factor of half these numbers is unity, i.e. there will be only one closed loop. The outstanding cores are connected to this loop as laid down by Rule 4 and described with reference to Figs. 4 and 5.

The plotting methods above described may be considerably varied whilst still producing an indicated disposition of read wire that is within the scope of the invention. For example, the starting term ($u$, $v$) may be composed of other than odd and even integers respectively, the core sequence terms being modified appropriately. Where, for example, $u$ and $v$ are both even the $r$th core sequence term is the $(r+u-1)$th term of the $x$ sequence and the $(r-v+2m)$th term of the $y$ sequence.

The steps prescribed by Rule 2 need not be carried out for every plot; once the plotting principle has been grasped the course of the read wire may be determined by the eye and rapidly sketched in without recourse to any calculations. Where the derived matrix is different from the given matrix, the course of the read wire may be plotted on the given matrix, rather than on the derived matrix, the additional cores being included as prescribed by Rule 4 in the same operation; in other words, the separate operations described with reference to Figs. 4 and 5 may be combined.

What we claim is:

1. A magnetic-core storage device including a matrix of like magnetic ring cores each having properties capable of recording a binary digit disposed in mutually perpendicular columns and rows to lie within a regular rectangular pattern, a first plurality of conductors, one for each column of cores and threading all the cores in that column, a second plurality of conductors, one for each row of cores and threading all the cores in that row, means for selectively energising said conductors so as to saturate any core in a desired sense, and a single read wire threading all the cores of the matrix once each along a path of an imaginary figure of Lissajous form.

2. A magnetic-core storage device including a matrix of like magnetic ring cores each having properties capable of recording a binary digit disposed in mutually perpendicular columns and rows to lie within a regular rectangular pattern, a first plurality of conductors, one for each column of cores and threading all the cores in that column, a second plurality of conductors, one for each row of cores and threading all the cores in that row, means for selectively energising said conductors so as to saturate any core in a desired sense, and a single read wire threading all the cores of the matrix once each along a path of an imaginary figure which is of Lissajous form except between at least one penultimate column of cores and the adjacent end column of cores.

3. A magnetic-core storage device as claimed in claim 2 wherein each part of the path joining two successive cores in the penultimate column includes between said two cores the two adjacent cores of the adjacent end column.

4. A magnetic-core storage device as claimed in claim 3 wherein each said part of the path is such that the two portions of it which extend from said two successive cores to said two adjacent cores, each to each, cross one another.

5. A magnetic-core storage device including a matrix of like magnetic ring cores each having properties capable of recording a binary digit disposed in mutually perpendicular columns and rows to lie within a regular rectangular pattern, a first plurality of conductors, one for each column of cores and threading all the cores in that column, a second plurality of conductors, one for each row of cores and threading all the cores in that row, means for selectively energising said conductors so as to saturate any core in a desired sense, and a single read wire threading all the cores of the matrix once each along a path formed by interconnecting a plurality of imaginary figures each of Lissajous form, the interconnections being such that substantially no resultant electromotive force is induced in the read wire by a varying magnetic field common to the whole matrix.

6. A magnetic-core storage device including a matrix of like magnetic ring cores each having properties capable of recording a binary digit disposed in mutually perpendicular columns and rows to lie within a regular rectangular pattern, a first plurality of conductors, one for each column of cores and threading all the cores in that column, a second plurality of conductors, one for each row of cores and threading all the cores in that row, means for selectively energising said conductors so as to saturate any core in a desired sense, and a single read wire threading all the cores of the matrix once each along a path formed by interconnecting a plurality of imaginary figures each of which is of Lissajous form except between at least one penultimate column of cores and the adjacent end column of cores, the interconnections being such that substantially no resultant electromotive force is induced in the read wire by a varying magnetic field common to the whole matrix.

7. A magnetic-core storage device as claimed in claim 6 wherein each part of the path joining two successive cores of the penultimate column includes between said two cores the two adjacent cores of the adjacent end column.

8. A magnetic-core storage device as claimed in claim 7 wherein each said part of the path is such that the two portions of it which extend from said two successive cores to said two adjacent cores, each to each, cross one another.

(References on following page)

References Cited in the file of this patent

UNITED STATES PATENTS

| | | |
|---|---|---|
| 2,691,156 | Saltz | Oct. 5, 1954 |
| 2,724,103 | Ashenhurst | Nov. 15, 1955 |
| 2,732,542 | Minnick | Jan. 24, 1956 |
| 2,776,419 | Rajchman | Jan. 1, 1957 |

OTHER REFERENCES

"A Review of Magnetic and Ferro-Electric Computing Components," by V. L. Newhouse, published in "Electronic Engineering," May 1954, pages 192–199.

"Multiple Coincidence Magnetic Storage Systems," by R. C. Minnick and R. L. Ashenhurst, published in "Journal of Applied Physics," vol. 26, No. 5, May 1955, pages 575–579.